UNITED STATES PATENT OFFICE.

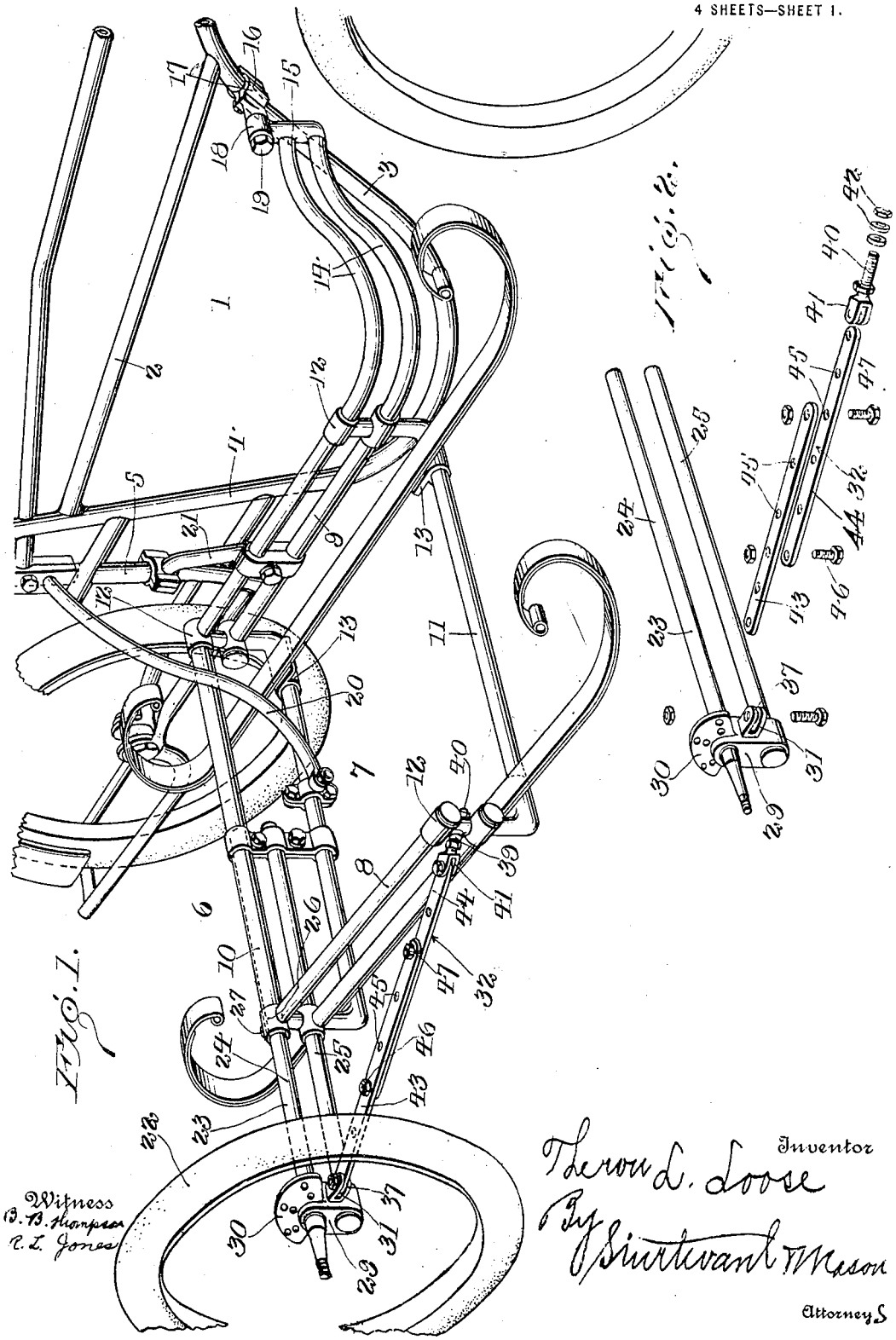

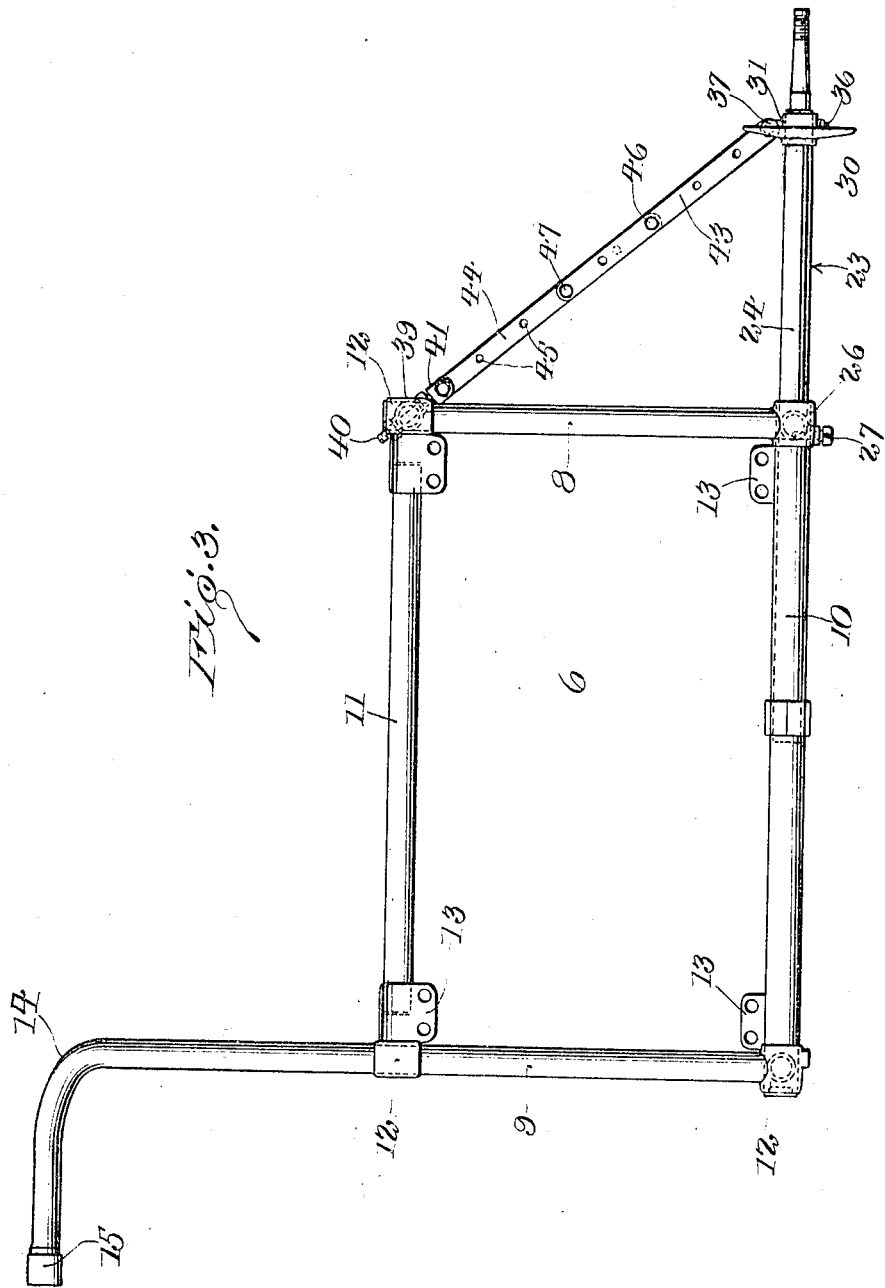

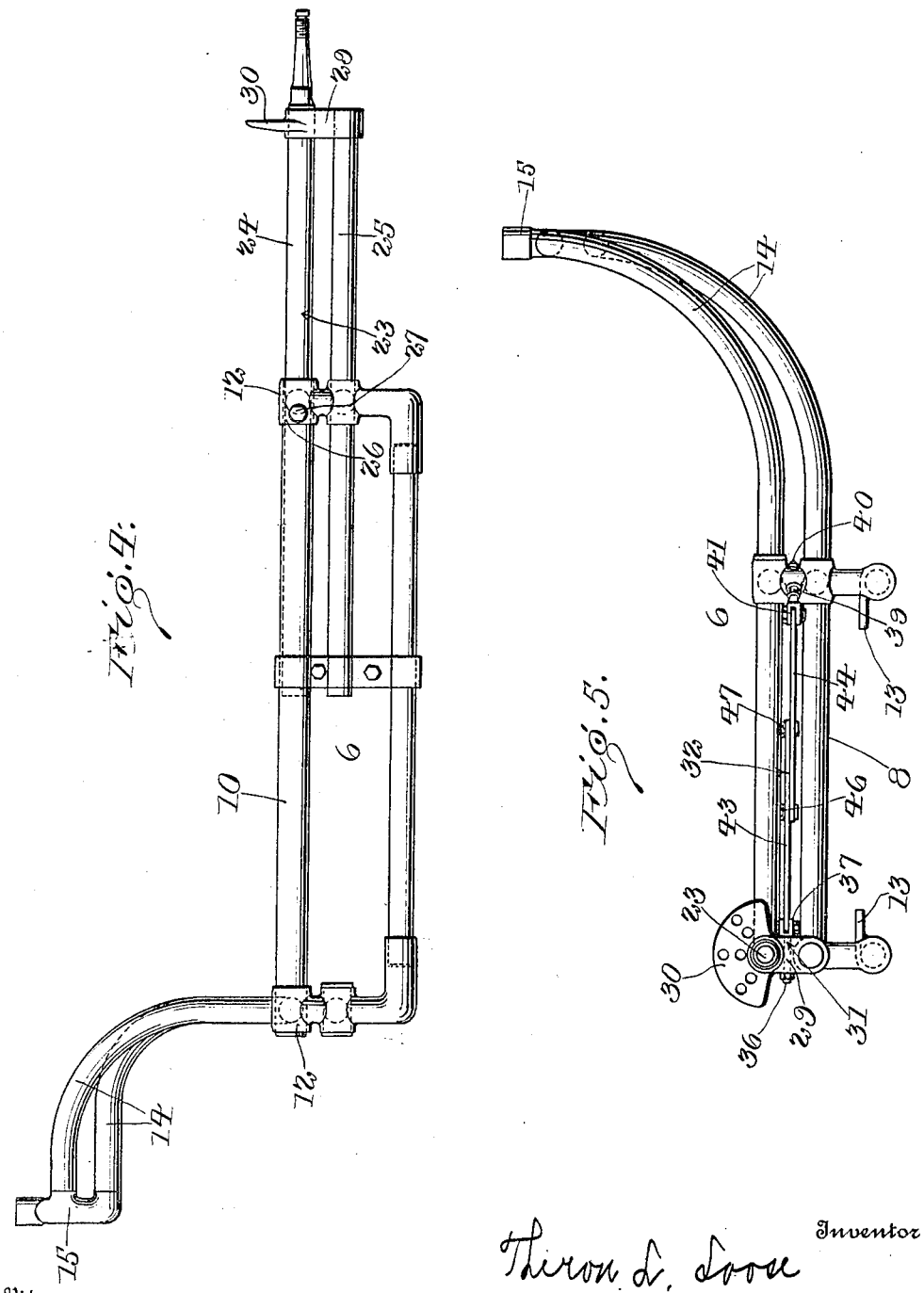

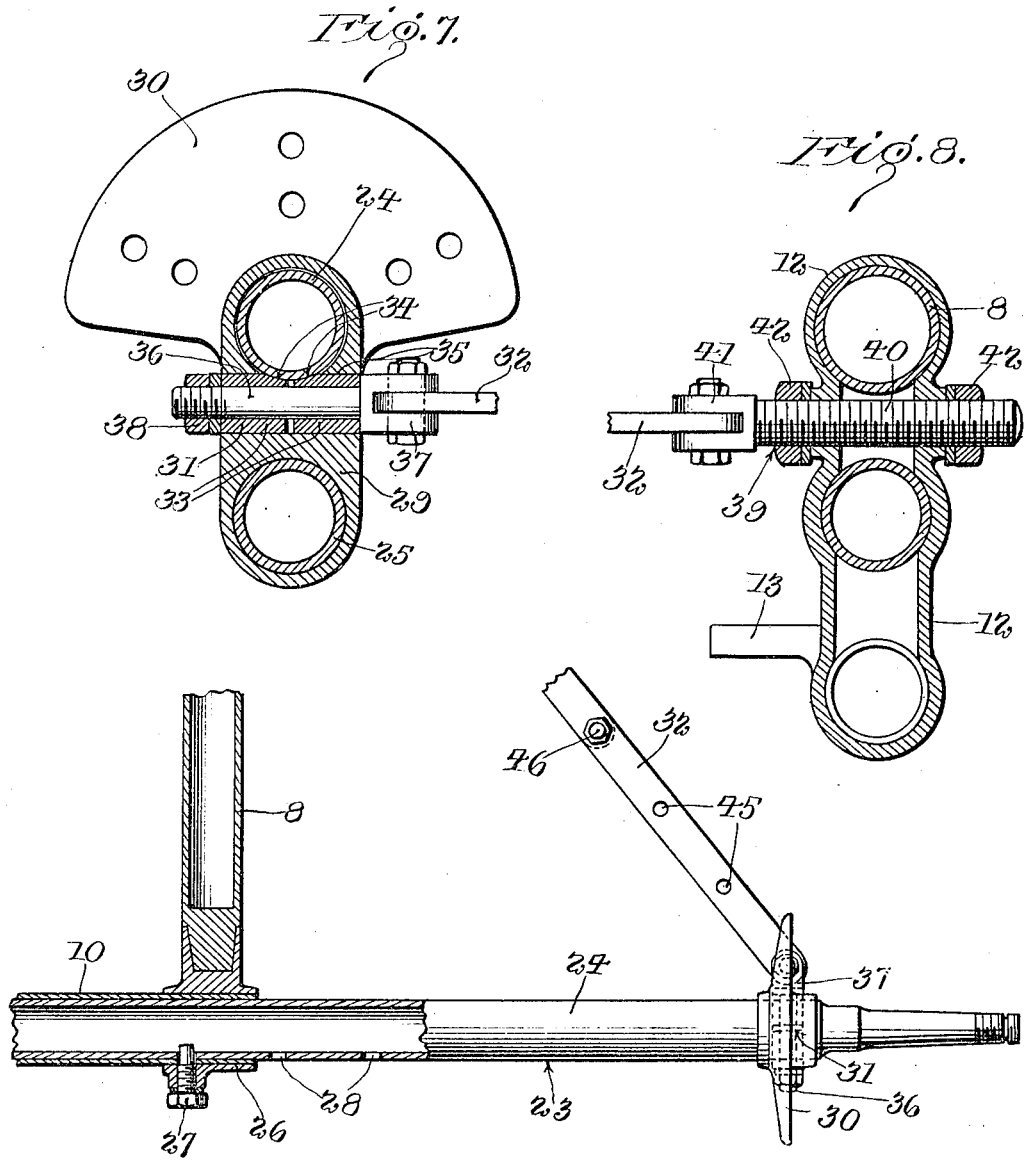

THERON L. LOOSE, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

SIDE CAR FOR MOTOR-CYCLES.

1,256,341.  Specification of Letters Patent.  Patented Feb. 12, 1918.

Application filed May 23, 1916. Serial No. 99,371.

*To all whom it may concern:*

Be it known that I, THERON L. LOOSE, a citizen of the United States, residing at Springfield, in the county of Hampden, State of Massachusetts, have invented certain new and useful Improvements in Side Cars for Motor-Cycles, of which the following is a description, reference being had to the accompanying drawing and to the figures of reference marked thereon.

The invention relates to certain new and useful improvements in side car attachments for motorcycles.

The object of this invention is the provision of a motorcycle having detachably connected thereto a side car with special means for varying the tread distances between the wheel of the said side car and the wheels of the motorcycle.

With this and other objects in view the invention further consists in the combination and arrangement of parts hereinafter described and pointed out in the appended claims.

In the drawings which show by way of illustration an embodiment of the invention:

Figure 1 is a perspective view of a motorcycle having attached thereto a side car, the wheel of said side car being shown in an extended position;

Fig. 2 is a detached perspective view of the extensible axle and adjustable brace rod;

Fig. 3 is a plan view of the frame of the side car showing the axle in an extended position;

Fig. 4 is a rear view of the frame of the side car shown in Fig. 3;

Fig. 5 is a side view thereof;

Fig. 6 is a detail horizontal sectional view of the extended axle and the means for securing the same in an adjusted position;

Fig. 7 is a detail vertical sectional view through one end of the extensible axle and the connection for one end of the brace rod; and Fig. 8 is a detail vertical sectional view through a portion of the frame of the side car, showing the connection for the opposite end of the brace rod.

The motorcycle is shown at 1 and has a main frame 2 to which the side car is attached. The main frame 2 includes the forwardly inclined bar 3, and the substantially vertical bars 4 and 5 positioned a short distance in advance of the rear wheel. While I have shown and described this form of frame, it will be understood that various types can be substituted. The type and design of the motorcycle may also be varied.

The side car 6 may include any form of body (not shown) mounted upon a frame 7 which can be readily attached to the frame of the motorcycle. The side car frame 7 comprises a plurality of spaced parallel bars arranged to form the sides 8, 9, and the ends 10, 11 (see Fig. 1). Suitable corner brackets 12 are provided onto which the said parallel bars are brazed or otherwise secured. These corner pieces are provided with the spring supports 13 to which the springs of the side car are secured.

The parallel bars forming the side 9 of the frame 7 extend forward beyond the inside corner piece 12, and are inclined upwardly, and inwardly as at 14, terminating in a fitting 15, from which extends the forward coupling device 16 for securing the side car to the motorcycle. This coupling device is preferably in the form of a clip 17 adapted to encircle the inclined bar 3 of the motorcycle frame and be secured thereto. The said clip is secured in the eye 18 of the fitting 15 in any desired manner as for instance, by nut 19, as shown.

Another connecting brace 20 is shown extending from the end 10 of the side car frame and connecting the motorcycle frame thereto in a similar manner, and a further connecting brace 21 may also be provided extending from the side 9 of the side car frame and attaching the motorcycle thereto in a like manner as shown.

From this construction, it will be seen that the side car can be easily attached to the motorcycle and securely held in position.

The wheel 22 of the side car is mounted upon the end of an extensible axle 23, which is shown herein as comprising spaced parallel bars 24 and 25, the upper one of which carries the spindle on which the said wheel is mounted.

These parallel bars 24 and 25 are slidably mounted in the end 10 of the frame 7; the upper bar 24 telescoping through the corner bracket 12 into the upper parallel bar of the end 10, and passing through a sleeve 26 formed in the said corner bracket 12 between the spaced parallel bars of the said end 10. A set-screw 27 is threaded into the corner bracket 12 and is adapted to enter openings 28 formed at predetermined distances in the upper bar 24, (see Fig. 6) for securing the axle in its adjusted position.

The outer ends of the parallel bars 24 and 25 are suitably held in a block 29 on which latter a mud guard bracket 30 is formed (see Fig. 7). As shown, the end of the lower parallel bar 25 is fitted and brazed into an opening in the block 29. The end of the upper parallel bar 24 is secured in place by means of a fastening device 31 to one end of which a connecting brace 32 is secured.

The fastening device 31 comprises oppositely arranged spaced bushings 33 provided on their inner ends with arcuate clamping surfaces 34 adapted to conform to the curve of the parallel bar 24, as shown in Fig. 7. These bushings 33 are fitted into an opening 35 in the block 29 and have passing therethrough a bolt 36. On one end of the bolt 36 a bifurcated head 37 is formed against which one bushing 33 abuts, and into which one end of the brace 32 is secured. The opposite end of the said bolt 36 is threaded and receives a suitable nut and washer 38 adapted to abut the end of the opposite bushing 33.

From this construction, it will be seen that when the above described parts of this fastening device 31 are assembled the arcuate surface 34 of the bushings 33 will be clamped against the upper bar 24 by tightening the nut upon the threaded end of the bolt 36. It will also be obvious that an adjustment of the block 29 can be readily made upon the upper parallel bar 24 by loosening the fastening device 31 and sliding the block on the said bar 24 to the desired position.

The brace connection 32 extends from the fastening device 31 in the block 29 to the outer forward corner bracket 12 of the frame 7 (see Figs. 1 and 3). A suitable fastening device 39 is provided in this corner bracket and comprises a threaded bolt 40, provided on one end with a bifurcated head 41 adapted to receive the opposite end of the connecting brace 32 (see Fig. 8). The bolt 40 passes through an opening in the corner bracket and is provided on each end with nuts and washers 42 for securing said bolt therein.

From this construction, as shown in Fig. 8, it will be seen that the relative position of the bolt 40 can be easily adjusted in tightening the brace connection 32 after the desired tread distance has been secured by adjusting the extensible axle.

The brace connection 32 consists of adjustable bars 43 and 44 pivotally secured in the bifurcated heads 37 and 41, respectively. These bars 43 and 44 are provided with openings 45 arranged to register in obtaining an adjustment and receive bolts 46 and 47 for maintaining said adjustment, as will be readily understood.

The operation of the hereinbefore described parts is, as follows:

In extending the axle 23, and thereby increasing the tread of the combined vehicle, the brace connection 32 is unfastened by removing bolts 46 and 47. Set screw 27 is then withdrawn from the opening 28 in the upper parallel bar 24, and the axle is now free to slide within the frame 7, as heretofore described. When the desired tread distance is obtained the set-screw 27 is positioned within the opening 28 corresponding to the desired tread distance, and the brace 32 is connected by the registering of the openings 45 and the insertion of the bolts 46 and 47. The correct adjustment and register of the openings 45 are best accomplished by manipulating the fastening device 39 hereinbefore described, and by loosening the nuts 42 on the ends of the bolt 40 the openings 45 can be easily alined and the brace connection then tightened.

Having thus described my invention, what I claim as new and desire to secure by Letters Patent, is:

1. The combination with a motorcycle, of a side car detachably connected thereto comprising a frame, an extensible axle carried by said frame, means for holding said axle in its extended position, and an adjustable link connection extending from a point near the end of said axle to the forward part of the frame for bracing the axle.

2. The combination with a motorcycle, of a side car connected thereto comprising a frame, an adjustable axle carried by the said frame, a wheel on the outer end of said axle, a support for the inner end of the axle including a bar of the frame and a clamp, means for holding said axle in an adjusted position comprising a set screw, and an adjustable link connection extending from a point near the outer end of said axle to the forward part of the frame for bracing the axle.

3. The combination with a motorcycle, of a side car connected thereto comprising a frame, an extensible axle formed of spaced parallel bars slidably mounted in said frame, means for securing said axle in an extended position, and an adjustable brace connecting the outer end of the axle to the forward part of the frame of the side car.

4. The combination with a motorcycle, of a side car connected thereto, comprising a frame, an extensible axle formed of spaced parallel bars, a wheel spindle on one of said parallel bars, supporting means for said axle including a bar of the frame adapted to receive one of said parallel bars, and a support carried by the frame adapted to receive the other of said parallel bars, and means for holding said axle in an extended position.

5. The combination with a motorcycle, of a side car connected thereto, comprising a frame, an extensible axle mounted in said frame, means for securing said axle in an extended position, and means for bracing the said axle when so extended, including pivoted links carried by the said axle and frame of the side car respectively and adapted to be secured together.

6. The combination with a motorcycle, of a wheeled side car connected thereto, comprising a frame, an extensible axle carried by said frame, a support for said axle at its outer end including a block, and a fender support provided on said block for securing the fender of the wheel of the side car thereto.

7. The combination with a motorcycle, of a wheeled side car connected thereto, comprising a frame, an extensible axle carried by said frame, a support for the outer end of said axle, and a fender for the wheel of the side car carried by said support and movable with the extensible axle.

8. The combination with a motorcycle, of a wheeled side car connected thereto, comprising a frame, an extensible axle carried by said frame, a support for the outer end of said axle, means for securing said axle in said support, a brace connected at one end to said means extending to the forward portion of the said frame, and means carried by said frame for adjustably securing the other end of said brace thereto.

In testimony whereof, I affix my signature in the presence of two witnesses.

THERON L. LOOSE.

Witnesses:
C. L. STURTEVANT,
JOHN D. STEPHENS.

Copies of this patent may be obtained for five cents each, by addressing the "Commissioner of Patents, Washington, D. C."